United States Patent
Eisenhour et al.

(10) Patent No.: US 7,975,496 B2
(45) Date of Patent: Jul. 12, 2011

(54) VEHICLE AIR CONDITIONING SYSTEM

(75) Inventors: Ronald S. Eisenhour, West Bloomfield, MI (US); Charles Sprunger, Saline, MI (US)

(73) Assignee: Nissan North America, Inc., Franklin, TN (US)

(*) Notice: Subject to any disclaimer, the term of this patent is extended or adjusted under 35 U.S.C. 154(b) by 480 days.

(21) Appl. No.: 12/189,507

(22) Filed: Aug. 11, 2008

(65) Prior Publication Data
US 2010/0031680 A1 Feb. 11, 2010

(51) Int. Cl.
*F25B 41/04* (2006.01)
*F25B 49/00* (2006.01)
*F25D 17/04* (2006.01)
*B60H 1/32* (2006.01)
*G05D 21/00* (2006.01)

(52) U.S. Cl. ............ 62/228.1; 62/176.1; 62/176.6; 62/244; 236/44 R

(58) Field of Classification Search .......... 62/176.1, 62/176.6, 115, 150, 239, 244, 228.1; 236/44 C, 236/44 R
See application file for complete search history.

(56) References Cited

U.S. PATENT DOCUMENTS

| 7,165,411 B2 | 1/2007 | Eisenhour |
| 7,296,621 B2 | 11/2007 | Yonekura et al. |
| 2008/0066477 A1 | 3/2008 | Aoki et al. |

OTHER PUBLICATIONS

Author N/A, "Efficient A/C Operation Using Dew-point Temperature", Supercharger, article, Aug. 2008.

*Primary Examiner* — Chen-Wen Jiang
(74) *Attorney, Agent, or Firm* — Global IP Counselors, LLP

(57) ABSTRACT

A vehicle air conditioning system includes a compressor, a condenser, an evaporator, a humidity sensor and a controller. The compressor is configured to compress refrigerant and the condenser is fluidly coupled to the compressor to receive the refrigerant from the compressor. The evaporator is fluidly coupled to the condenser to receive the refrigerant from the condenser and fluidly coupled to the compressor to supply the refrigerant to the compressor. The humidity sensor is positioned proximate the evaporator to detect moisture density of air passing through the evaporator towards a vehicle passenger compartment. The controller is operatively coupled to the humidity sensor and the compressor to cycle the compressor on and off to maintain the moisture density in the air being cooled by the evaporator and sensed by the humidity sensor below a predetermined moisture density threshold.

13 Claims, 12 Drawing Sheets

VEHICLE AIR CONDITIONING SYSTEM

BACKGROUND OF THE INVENTION

1. Field of the Invention

The present invention relates to a vehicle air conditioning system that controls compressor cycling in order to reduce engine workload. More specifically, the present invention relates to a vehicle air conditioning system that controls compressor cycling in response to humidity conditions at the air conditioning system evaporator.

2. Background Information

Vehicle air conditioning systems typically maintain the temperature of the passenger compartment by operating a compressor to keep the evaporator at a temperature just above the freezing point of water. Air passing through the evaporator is cooled but is too cold to send directly into the passenger compartment. In recent model vehicles, a portion of the cooled air is re-heated by passing the portion of the cooled air through the heater core. The cold air and the re-heated air are mixed together prior to entering the passenger compartment in order to deliver cooled air that is not frigid.

This conventional way of operating the vehicle air conditioning system is inherently inefficient. Energy is wasted by cooling the evaporator to a temperature just above the freezing point of water regardless of the cooling requirements. Further, the re-heating of cooled air represents an additional waste of energy.

Further, since the evaporator is cooled to a temperature that is close to, but above the freezing point of water regardless of cooling requirements of the air conditioning system, the cooled air is substantially dehumidified. Specifically, the majority of the moisture in the air passing through the evaporator condenses on the outer cooling surfaces of the evaporator. This moisture then typically drains out of the evaporator casing and falls beneath the vehicle. This results in an over-drying of the air entering the passenger compartment. For the comfort of the passengers, it is not necessary to remove all the moisture from the cooled air.

From a safety perspective, it is only necessary to remove sufficient amounts of moisture from the cooled air to prevent fogging on the interior surfaces of the windows of the vehicle. From a comfort perspective, it is only necessary to remove sufficient amounts of moisture to make passengers feel cool and comfortable.

Another disadvantage to the above air conditioner operation relates to odor management. Specifically, when the passenger compartment reaches the requested temperature, the compressor may shut off for a lengthy period of time before operating again. Under such circumstances, if the blower is still blowing air through the evaporator, moisture that has collected on the evaporator begins to evaporate. The vaporized moisture can have an undesirable aroma as it enters the passenger compartment.

In view of the above, it will be apparent to those skilled in the art from this disclosure that there exists a need for an improved vehicle air conditioning system that operates in a more efficient manner and reduces formation of undesirable odors. This invention addresses this need in the art as well as other needs, which will become apparent to those skilled in the art from this disclosure.

SUMMARY OF THE INVENTION

One object of the present invention is to reduce the thermal loading of an air conditioning system.

Another object of the present invention is to reduce the work of a vehicle engine necessary to operate an air conditioning system compressor.

Another object of the present invention is to minimize compressor operation while preventing fogging or condensation on inner surfaces of the vehicle windows.

Another object of the present invention is to minimize the amount of moisture removed from cooled air passing over the heat exchanging surfaces of an air conditioning system evaporator.

In accordance with one aspect of the present invention, a vehicle air conditioning system includes a compressor configured to compress refrigerant and a condenser fluidly coupled to the compressor to receive the refrigerant from the compressor. The vehicle air conditioning system also includes an evaporator fluidly coupled to the condenser to receive the refrigerant from the condenser and fluidly coupled to the compressor to supply the refrigerant to the compressor. A humidity sensor is positioned proximate the evaporator to detect moisture density of air passing through the evaporator towards a vehicle passenger compartment. A controller is operatively coupled to the humidity sensor and the compressor to cycle the compressor on and off to maintain the moisture density in the air being cooled by the evaporator and sensed by the humidity sensor below a predetermined moisture density threshold.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
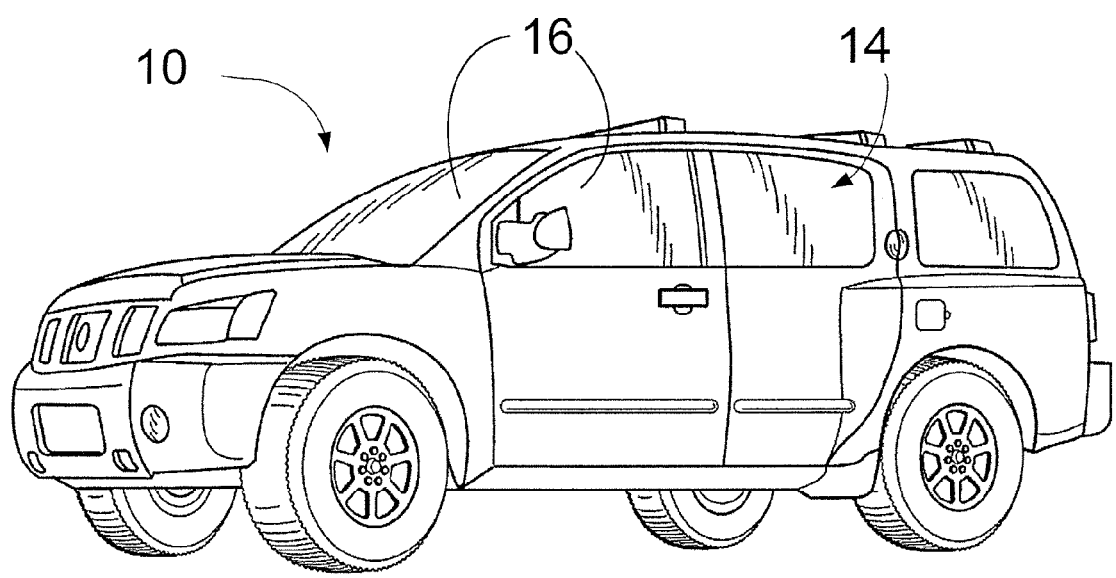
FIG. 1 is a perspective view of a vehicle having a passenger compartment with windows and an air conditioning system in accordance with the present invention.
Figure 2:
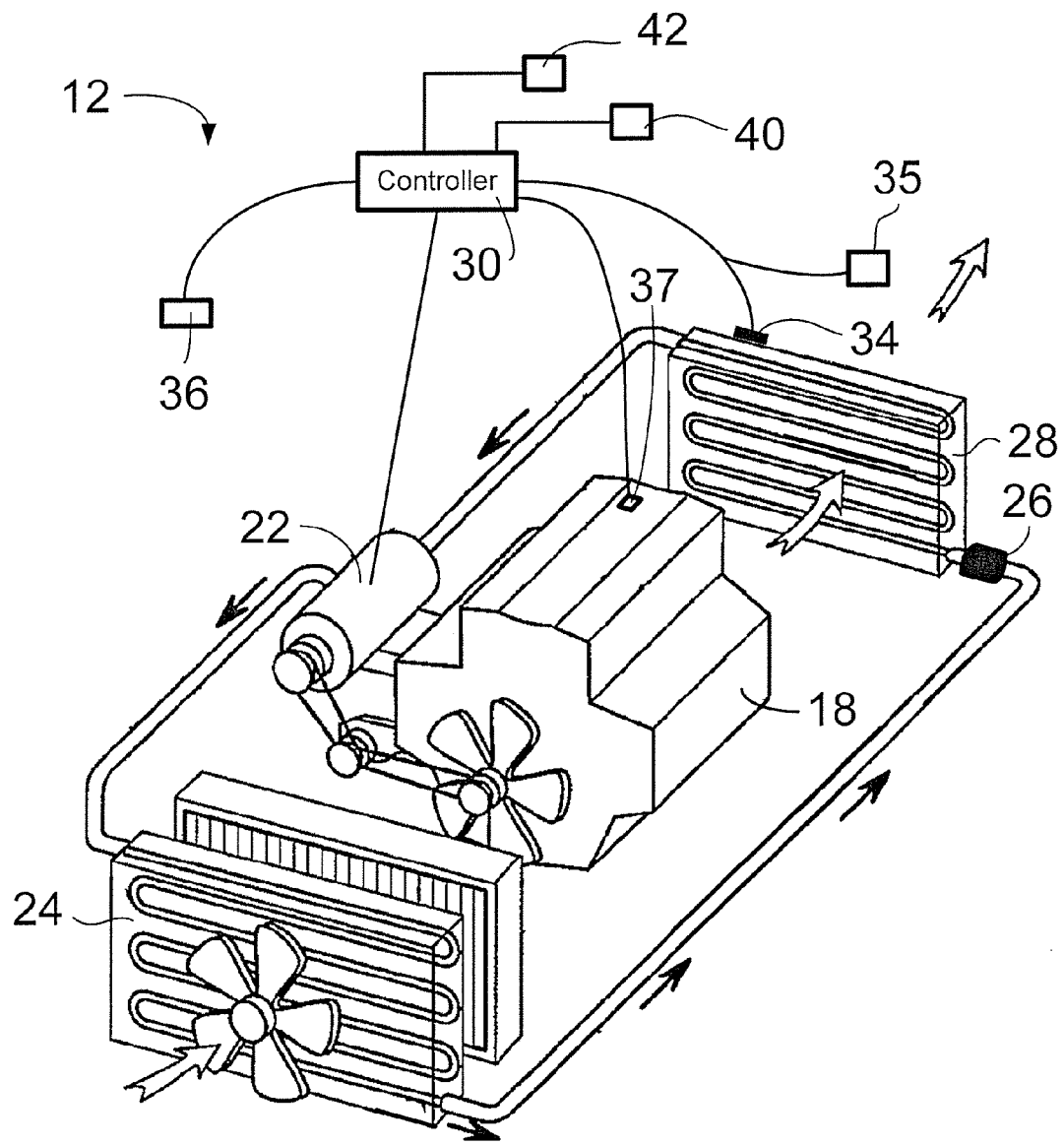
FIG. 2 is a schematic view of the air conditioning system shown with the vehicle engine, the air conditioning system having a compressor powered by the engine, a condenser, a controller and an evaporator in accordance with the present invention.
Figure 3:
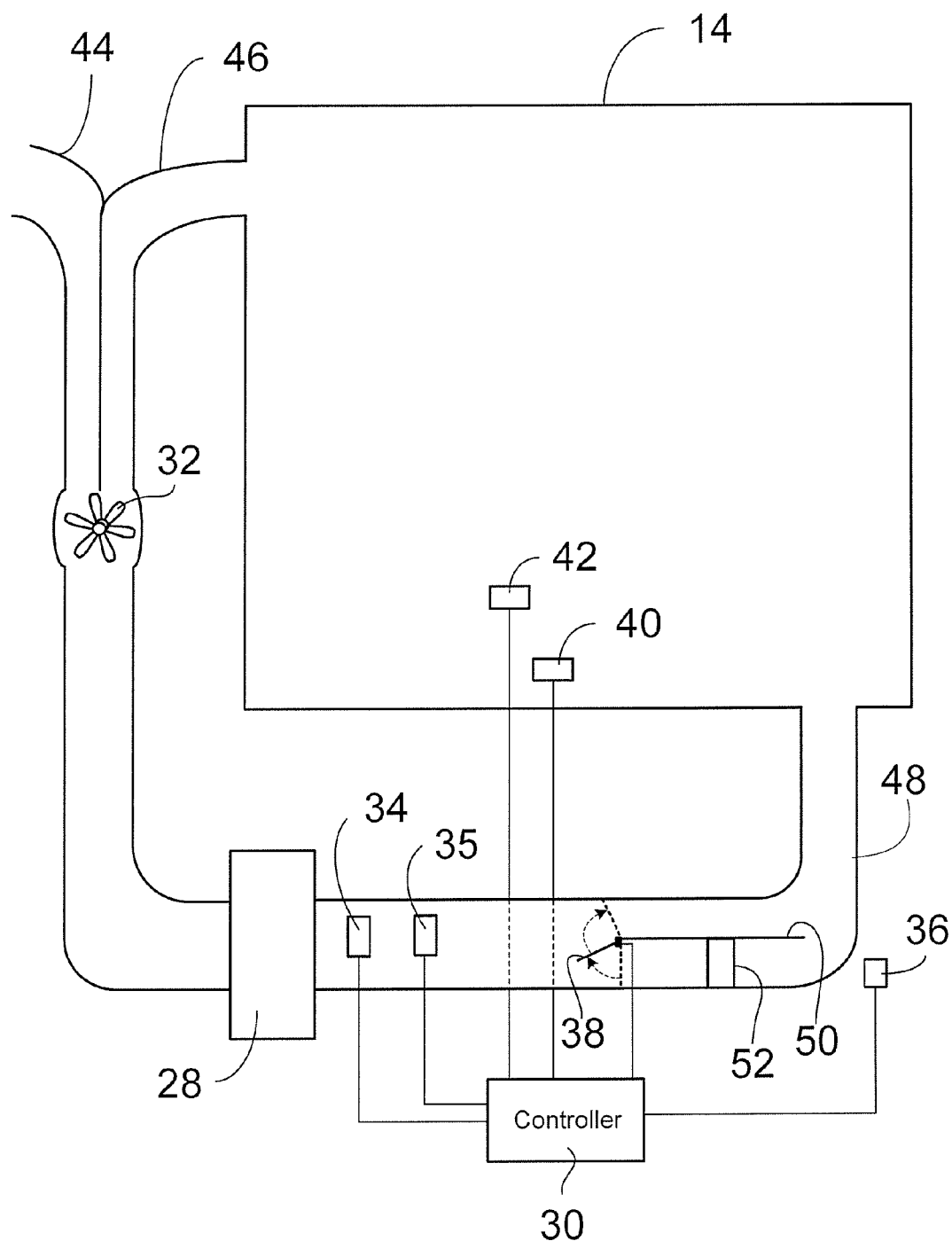
FIG. 3 is a schematic view of the air conditioning system showing a passenger compartment, the controller, the evaporator, a blower, a heater core mixing portion and various sensors connected to the controller in accordance with the present invention.

Referring initially to FIGS. 1, 2 and 3, a vehicle 10 is illustrated in accordance with a first embodiment of the present invention. The vehicle 10 includes an air conditioning system 12 (FIGS. 2 and 3), a passenger compartment 14 (FIGS. 1 and 3) with windows 16 (FIG. 1) and an engine 18 (FIG. 2).

As shown in FIG. 2, the air conditioning system 12 includes a compressor 22, a condenser 24, an expansion device 26, an evaporator 28 and a controller 30. The compressor 22 is configured to compress refrigerant. Operation of the compressor 22 is controlled by the controller 30, as described in greater detail below. The compressor 22 includes a conventional clutch or other similar mechanism such that the rotation of the engine 18 selectively powers the compressor 22. The condenser 24 is fluidly coupled to the compressor 22 to receive the compressed refrigerant from the compressor 22 and dissipate heat therefrom in a conventional manner. The expansion device 26 is configured to throttle the refrigerant allowing it to expand, thereby reducing pressure of the refrigerant as the refrigerant enters the evaporator 28. The evaporator 28 is fluidly coupled to the condenser 24 via the expansion device 26 to receive the expanded refrigerant from the condenser 24. The evaporator 28 is further configured to cool or absorb heat from air provided to the passenger compartment 14 and is further fluidly coupled to the compressor 22 to supply the refrigerant to the compressor 22. The compressor 22, condenser 24, the expansion device 26 and the evaporator 28 are preferably conventional devices fluidly connected to one another by conventional high and low pressure refrigerant lines. Consequently, description of these conventional devices is omitted for the sake of brevity.

As best shown in FIGS. 2 and 3, the air conditioning system 12 also includes a blower 32 (FIG. 3 only), a humidity sensor 34, a temperature sensor 35, an ambient temperature sensor 36, a coolant temperature sensor 37 (FIG. 2 only), an air flow control door 38 (FIG. 3 only), a passenger compartment temperature sensor 40 and an optional passenger detection device 42. The controller 30 is operably connected to each of the humidity sensor 34, the temperature sensor 35, the ambient temperature sensor 36, the air flow control door 38, the passenger compartment temperature sensor 40 and the optional passenger detection device 42.

The following terms are used to assist in the understanding of the various embodiments of the present invention. These terms are listed below with brief definitions.

The term "requested outlet temperature RO" refers to a temperature of air to be delivered to the passenger compartment 14. The requested outlet temperature RO corresponds to a setting of air conditioning controls (not shown) on the dashboard (not shown), which may be adjusted by a driver or passenger of the vehicle 10.

The term "moisture density threshold Ma" refers to a maximum desired humidity level within the vehicle 10. For instance, the moisture density threshold Ma can be a maximum permitted humidity level within the passenger compartment 14. In the present invention, the moisture density threshold Ma is a maximum amount of humidity that is determined by the controller 30 to be acceptable in the passenger compartment 14 in order to avoid condensation of moisture on interior surfaces of the windows 16 and to maintain passenger comfort. In the present invention, the moisture density threshold Ma is not a permanently fixed percentage of humidity in air, but is re-evaluated and adjusted continuously while the air conditioning system 12 is operating. The moisture density threshold Ma is determined as a function of one or more of the following: the requested or expected temperature and the relative humidity within the vehicle 10; the ambient temperature outside of the vehicle 10; and various operating parameters of the air conditioning system 12, as described below.

The term "basic cooling mode" refers to an air conditioning operating mode where the compressor 22 is operated such that air passing through the evaporator 28 is cooled using standard temperature cycling limits that typically maximize dehumidification of the passenger compartment 14.

The term "reduced load mode" is an operating mode where the compressor 22 is operated by the controller 30 with logic that reduces the overall energy consumption of the compressor 22 when compared to conventional modes of operation of the air conditioning system 12. With the present invention the compressor 22 is cycled on and off in order to maintain the temperature within the passenger compartment 14, but the cycling of the compressor 22 is determined at least in part by measured humidity proximate the evaporator 28. More specifically, the operation of the compressor is controlled to maintain the humidity at the evaporator 28 at or below the moisture density threshold Ma.

The term "transition mode" refers to a mode of operation controlled by logic of the controller 30 as it operates the compressor 22. In the transition mode, the moisture content at the evaporator 28 (and hence the passenger compartment 14) is maintained at or below the moisture density threshold Ma as the logic of the controller 30 operates the compressor 22 between the basic cooling mode and the reduced load mode. Further, during the transition mode, the evaporator 28 is preferably dried out or partially dried out to reduce the overall amount of condensation on the cooling surfaces of the evaporator 28.

The term "upper evaporator control limit UCL" is a temperature that triggers the controller 30 to turn on the compressor 22. More specifically, the temperature is measured by the temperature sensor 35 proximate the evaporator 28. When the measured temperature at the evaporator 28 is equal to or greater than the upper evaporator control limit UCL, the controller 30 has logic that turns the compressor 22 on. The upper evaporator control limit UCL is a temperature that is based on an evaluation and continuing re-evaluation of various parameters of the air conditioning system 12 and is therefore not necessarily a fixed value.

The term "lower evaporator control limit LCL" is a temperature that triggers the controller 30 to turn off the compressor 22. The lower evaporator control limit LCL is a temperature that is based on an evaluation and continuing re-evaluation of various parameters of the air conditioning system 12 and is therefore not necessarily a fixed value. The lower evaporator control limit LCL and the upper evaporator control limit UCL define cycling limits for operation of the compressor 22 when the air conditioning system 12 operates in the reduced load mode.

The term "required evaporator temperature RE" is a temperature level that is continuously adjusted by the controller 30 in order to achieve compressor temperature cycling limits in response to moisture levels at the evaporator 28. The required evaporator temperature RE is used by the controller 30 to determined the lower evaporator control limit LCL and the upper evaporator control limit UCL. The required evaporator temperature RE is not a fixed temperature but rather is a temperature level that is re-evaluated and re-set by the controller 30, as described in greater detail below.

The term "passenger moisture emissions mPass" is defined as the anticipated moisture emitted by a passenger in a vehicle via perspiration and/or breathing. People generally lose moisture as they breathe, in particular in an atmosphere such as a cooled air conditioned space.

The term "comfort level humidity Cmfl" is defined as a level of humidity within the passenger compartment 14 that should be comfortable to a passenger or passengers.

It should be understood from the drawings and the description herein, that all temperatures and degrees in the following description are measured in Celsius or centigrade (° C.) unless otherwise stated.

Returning now to a description of the air conditioning system 12, the blower 32 (as shown in FIG. 3) is configured to draw air from outside the vehicle 10 via duct 44 and air from the passenger compartment 14 via duct 46. A door (not shown) can block or restrict outside air from entering via the duct 44. The blower 32 is further configured to move air along the heat exchanging surfaces of the evaporator 28 in a conventional manner. The blower 32 is operated by a fan switch (not shown) that is adjusted by a vehicle passenger or can alternatively be controlled by the controller 30. The air force generated by the blower 32 further causes air to move past the humidity sensor 34 and the temperature sensor 35, toward the air flow control door 38 and through a heater core 52 (depending upon the orientation of the air flow control door 38) and further through a duct 48 back to the passenger compartment 14, as indicated in FIG. 3.

The humidity sensor 34 is preferably positioned at a downstream side of the evaporator 28 (relative to the direction of air blown by the blower 32) between the evaporator 28 and the heater core 52. More specifically, the humidity sensor 34 is located downstream from the evaporator 28 but upstream from the heater core 52. The humidity sensor 34 is configured to detect the humidity or moisture density of the cooled air that has passed through the evaporator 28. The humidity sensor 34 can be positioned on the evaporator 28 or can be spaced apart from the evaporator 28, as indicated in FIG. 3. Preferably, the humidity sensor 34 is positioned close to or proximate the evaporator 28. Preferably, the humidity sensor 34 is positioned to measure the humidity at the evaporator 28, at all speeds of the operation of the blower 32.

The temperature sensor 35 is preferably located downstream from the evaporator 28 but upstream from the heater core 52. The temperature sensor 35 is configured to measure the temperature of air that has been cooled by the evaporator 28. The temperature sensor 35 is connected to the controller 30 so that the controller 30 can continuously monitor the temperature of air that has been cooled by the evaporator 28. Preferably, the temperature sensor 35 is adjacent to the humidity sensor 34 such that temperature measured by the temperature sensor 35 is used in determining the humidity level (moisture density) proximate the evaporator 28.

The ambient temperature sensor 36 is preferably located on the vehicle 10 such that the ambient or outdoor temperature (outside the vehicle 10) is measured. The ambient temperature sensor 36 is therefore preferably located outside of the passenger compartment 14. As described further below, one purpose of the ambient temperature sensor 36 is to provide an indication of the temperature on outer surfaces of the windows 16 so that the controller 30 can determine a temperature at which condensation is likely to occur on inner surfaces of the windows 16.

The air flow control door 38 is preferably located downstream from the evaporator 28 at the opening of a duct 50 that houses the heater core 52. The heater core 52 is a conventional element that is provided with heated coolant from the engine 18 in a conventional manner. The air flow control door 38 is a pivoting member that is configured to selectively divert a predetermined amount of the air cooled by the evaporator 28 and pass that portion of cooled air through the heater core 52. The air passing through the heater core 52 is heated and then mixes with the cooled air in the duct 48 prior to entering the passenger compartment 14. The air flow control door 38 is pivotable such that all of the air from the evaporator 28 can pass through the heater core 52 such as when heat is required in the passenger compartment 14.

The air flow control door 38, the duct 50 and the heater core 52 define an air mixing assembly. Mixing of air by control of the position of the air flow control door 38 provides a means for ensuring that the passenger compartment 14 is maintained at the requested outlet temperature RO when the air conditioning system 12 is operating. The air flow control door 38 includes a conventional positioning device (not shown) such as an electric stepper motor that is controlled by the controller 30.

The passenger compartment temperature sensor 40 is connected to the controller 30 to provide the controller 30 with a measurement of the temperature in the passenger compartment 14. The passenger compartment temperature sensor 40 is preferably located within the passenger compartment 14 but can alternatively be located in, for example, the duct 46 measuring temperature of air being drawn out of the passenger compartment 14.

The optional passenger detection device 42 is a device that detects the presence of a passenger within the passenger compartment 14. The passenger detection device 42 can be, for example, a seat switch (not shown) used by an airbag arming system that detects whether or not a passenger is seated in the seat. Alternatively, the passenger detection device 42 can be a device that detects the presence of a passenger or passengers using a sonic or optical detection device. The passenger detection device 42 is connected to the controller 30 so that the controller 30 can determine the potential moisture emissions of a passenger or passengers, as described below.

It should be understood from the drawings and description herein that the passenger detection device 42 is an optional device and is not a required element of the present invention.

For instance, if the passenger detection device 42 is omitted, the controller 30 can be programmed to automatically assume the presence of one or more passengers in addition to the vehicle operator.

It should also be understood from the drawings and the description herein that the air conditioning system 12 can be easily modified such that only one of either the passenger compartment temperature sensor 40 or the temperature sensor 35 is used. Specifically, it is possible for the controller 30 to control operation of the air conditioning system 12 using only the passenger compartment temperature sensor 40 or only the temperature sensor 35. However, in a preferred embodiment, both the temperature sensor 35 and the passenger compartment temperature sensor 40 are used to maximize efficiency of the air conditioning system 12.

The controller 30 is programmed and configured to control operation of the compressor 22 in order to balance at least the following objectives: first, achieve passenger demands for cool air in the passenger compartment 14; second, reduce condensation or fogging of the windows 16; third, reduce the release of humidity from the evaporator 28 in order to prevent noticeable odor within the passenger compartment 14 when elevating the temperature at the evaporator 28 and/or the passenger compartment 14; and fourth, minimize operation of the compressor 22 in order to increase fuel economy.

The controller 30 is configured or programmed to achieve the above objectives. For example, the controller 30 employs an air blending adjustment logic that manages the transitions of the evaporator temperature in order to maintain a target outlet temperature from the duct 48 entering the passenger compartment 14, as described below. The logic used by the controller 30 minimizes the amount of air passing through the evaporator 26 that is reheated by the heater core 52. In other words, the logic used by the controller 30 strives to minimize the amount of air that the air flow control door 38 diverts through the heater core 52. Consequently, the air mixing assembly (the air flow control door 38, the duct 50 and the heater core 52) is configured to selectively divert a minimal portion of the air passing through the evaporator 28 to the heater core 52. The controller 30 is operatively coupled to the air mixing assembly to control an amount of the air cooled by the evaporator 28 that is diverted through the heater core 52 to attain a predetermined temperature range within the passenger compartment 14.

The controller 30 is connected to the humidity sensor 34 and can therefore monitor humidity levels at the evaporator 28 in order to control cycling of the compressor 22 and thereby control the moisture delivered to the passenger compartment 14. In one embodiment of the present invention, the ambient temperature outside the vehicle 10 is measured by the ambient temperature sensor 36 and monitored by the controller 30 such that the controller 30 calculates the moisture density at which fog or condensation will potentially form on the windows 14.

The controller 30 controls operation of the compressor 22 so that it can provide enough cooling to satisfy the passenger cooling requirements within the passenger compartment 14 and provide humidity control in order to minimize the amount of moisture removed from cooled air passing over heat exchanging surfaces of the evaporator 28, but still maintains the humidity level low enough to prevent fogging on the windows 16 and reduce or eliminate unwanted odors from the evaporator 28. Optimization of compressor operation can reduce overall compressor operation and favorably impacts fuel economy since the engine 18 expends less energy powering the compressor 22.

The controller 30 is operably connected to the humidity sensor 34, the temperature sensor 35 and the compressor 22 in order to turn the compressor 22 on and off in a manner mentioned above and described in greater detail below. More specifically, the controller 30 is configured to maintain the moisture density in the air being cooled by the evaporator 28 and sensed by the humidity sensor 34 below the predetermined moisture density threshold Ma.

The controller 30 is also operatively coupled to the ambient temperature sensor 36. The ambient temperature sensor 36 is configured to measure outside air temperature and sends that temperature measurement to the controller 30.

Figure 5:
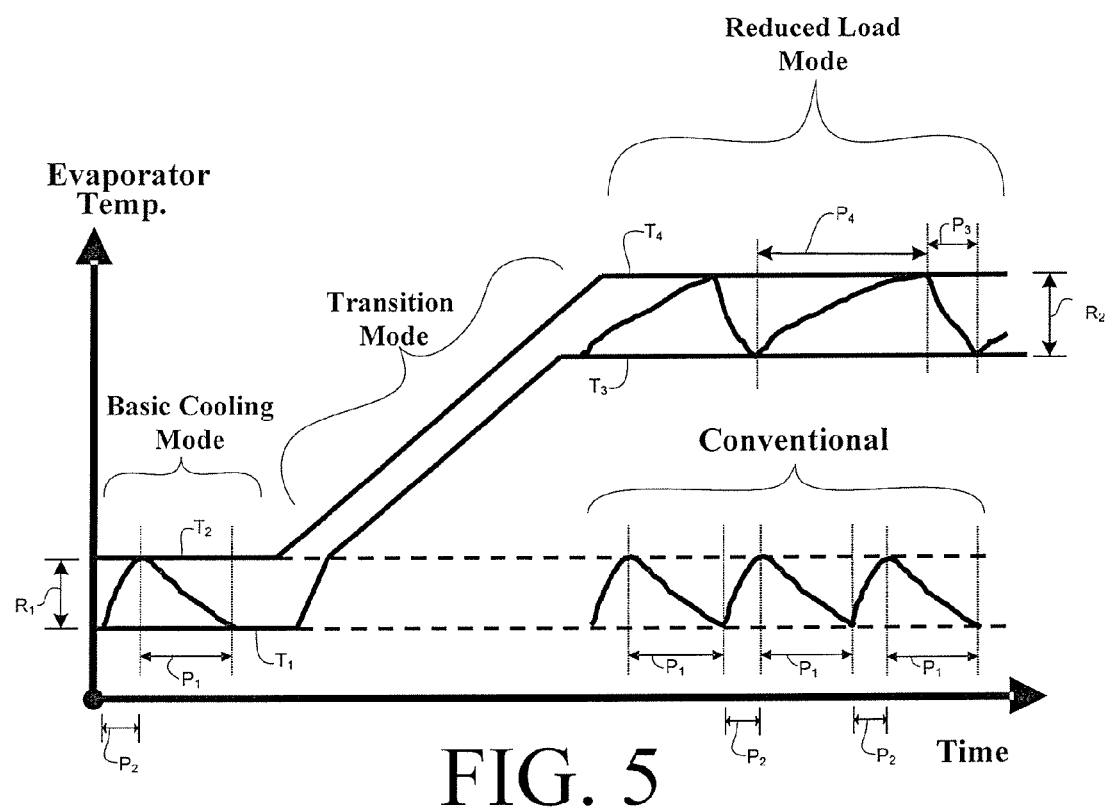
FIG. 5 is a chart showing evaporator temperature and compressor operation over time in a basic cooling mode, a transition mode and a reduced load mode in accordance with the first embodiment of the present invention.

The moisture density threshold Ma is determined based upon several possible parameters, as described below. The controller 30 initially determines or sets the moisture density threshold Ma based on the outside temperature in order to prevent or minimize window condensation and the comfort level humidity Cmfl. Specifically, the controller 30 is configured to operate the compressor 22 in order to keep the evaporator 28 at a temperature that condenses enough moisture to prevent fogging on the inner surface of the windows 16 and maintain humidity levels at or below the comfort level humidity Cmfl, even though the overall evaporator temperatures are higher than in a conventional vehicle air conditioning system, as indicated in FIG. 5.

The controller 30 is preferably pre-programmed with data tables that provide condensation conditions for specific temperature differentials. Specifically, the controller 30 includes data that enables it to correlate temperatures inside the passenger compartment 14 with temperatures outside the vehicle 10 (the ambient temperature sensor 36) and determine the approximate humidity level at which condensation will likely occur. For instance, meteorologists have determined the dew points for various temperature and atmospheric conditions and supply such information seasonally in weather forecasts. Similar information is stored in memory within the controller 30 such that once the ambient temperature outside the vehicle 10 has been measured by the ambient temperature sensor 36, the controller 30 uses the temperature information to determine the humidity level at which condensation or fogging will likely occur on the inner surfaces of the windows 16 within the passenger compartment 14 at the requested outlet temperature RO.

The controller 30 can additionally determine or set the moisture density threshold Ma in response to predetermined passenger moisture emissions. For example, the controller 30 can be programmed to assume that through breathing and perspiration, the average passenger gives off or emits an anticipated level of moisture to the air within the passenger compartment 14. The moisture density threshold Ma is modified by the controller 30 based upon passenger moisture emission assumptions which are stored as data in memory within the controller 30.

Alternatively, the controller 30 can be operably coupled to the optional passenger detection device 42 that detects the presence of at least one passenger or a group of passengers. The controller 30 is configured to determine passenger moisture emissions and modify or calculate the moisture density threshold Ma based upon the detected presence of one or more passengers.

The logic within the controller 30 can be arranged and implemented in a variety of ways, as demonstrated in the following embodiments. In the embodiments described below, the controller 30 basically includes logic that allows the air conditioning system 12 to operate in three cooling operating modes: the basic cooling mode, the transition mode and the reduced load mode. The basic cooling mode includes reducing the temperature of air within the passenger compartment 14 from a high temperature above the requested outlet temperature RO to or below the requested outlet temperature RO. The controller 30 checks the signal(s) from the temperature sensor 35 and the passenger operated temperature control panel and determines whether or not the passenger compartment 14 needs cold air. The controller 30 then operates the compressor 22 in the basic cooling mode where the evaporator 28 is allowed to absorb a maximum amount of heat from air prior to blowing the air into the passenger compartment 14. Control of the compressor 22 in the basic cooling mode is done in response to achieving a specific refrigerant pressure within the evaporator 28 or achieving a specific temperature at the evaporator 28, as represented in FIG. 5.

When the requested outlet temperature RO exceeds the evaporator's compressor-on temperature, the air conditioning system 12 operates in the transition mode for a brief time where a portion of condensed moisture on or around the evaporator 28 is allowed to slowly vaporize until the humidity sensor 34 and the controller 30 determine that the humidity level at the evaporator 28 has reached the moisture density threshold Ma. Thereafter, the controller 30 operates the air conditioning system 12 in the reduced load mode of operation. In the reduced load mode of operation, the compressor 22 is cycled on and off to maintain the humidity density at the evaporator 28 detected by the humidity sensor 34 at or below a moisture density threshold Ma (and at or below the comfort humidity level Cmfl), as described in greater detail below. Unlike conventional air conditioning systems, in the reduced load mode of operation, the compressor 22 is operated in order to achieve a specific humidity level or moisture density at the evaporator 28.

First Embodiment

Figure 4:
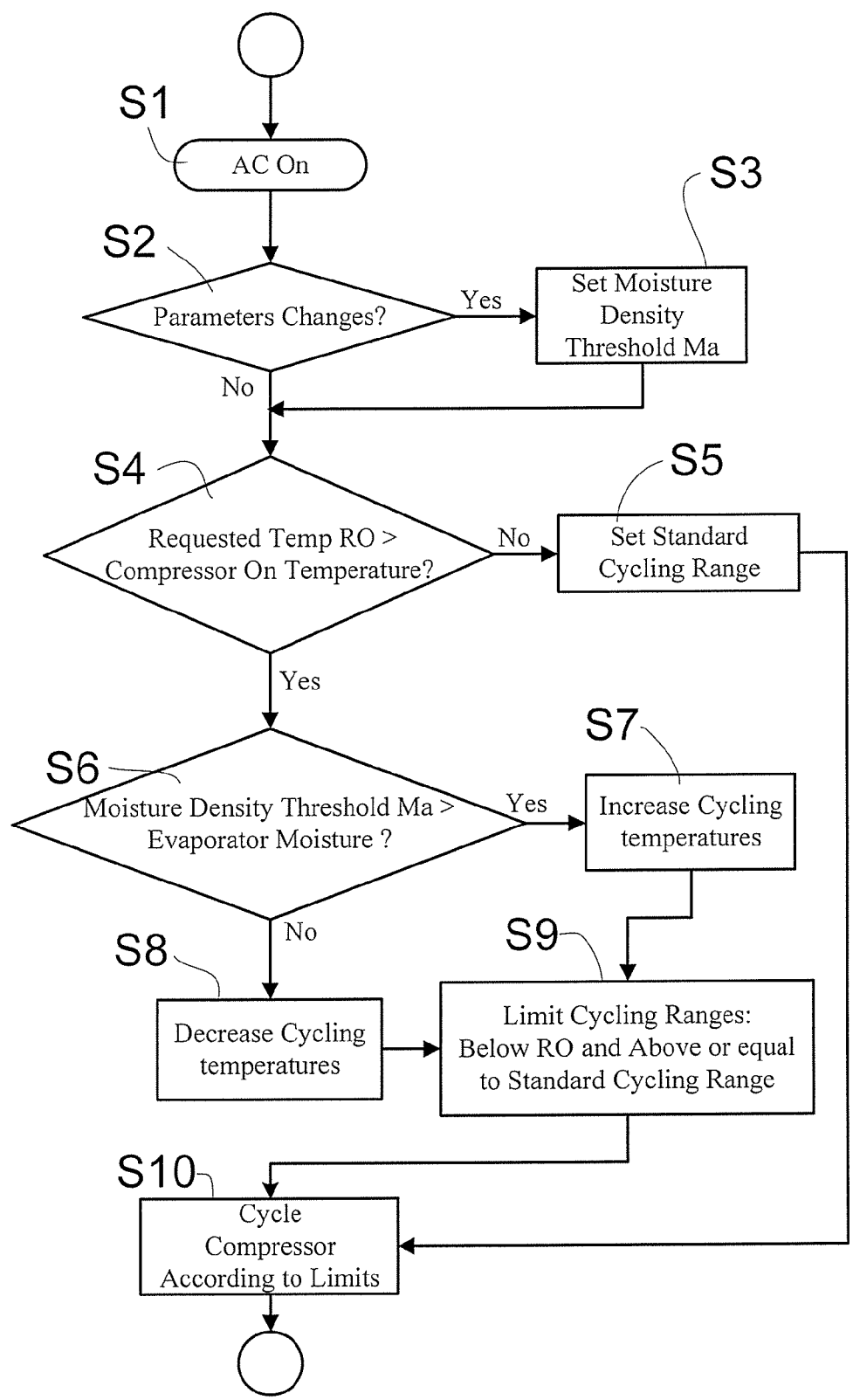
FIG. 4 is a flowchart showing basic steps of operation of the air conditioning system in accordance with a first embodiment of the present invention.

Referring now to FIGS. 4 and 5, operational steps in accordance with a first embodiment of the present invention will now be explained. In the first embodiment, the controller 30 is programmed or includes circuitry that enables operation of the compressor 22 including the basic steps described below. It should be understood from the drawings and the description below, that the depiction in FIG. 4 shows basic operational steps that can be implemented in a variety of ways. The first embodiment is one example of operation of the air conditioning system 12 by the controller 30.

At step S1, the air conditioning system 12 is switched on along with the blower 32 and initially, the air conditioning system 12 operates in the basic cooling mode with predetermined temperature cycling limits. The controller 30 determines the requested outlet temperature RO. If the requested outlet temperature RO does not exceed the compressor-on temperature, the controller 30 continues to engage the compressor 22 to cycle on and off in order to remove heat from the passenger compartment 14 in the basic cooling mode. When first starting up or being turned on after being turned off, the controller 30 operates the compressor 22 in the basic cooling mode in order to move heat out of passenger compartment 14 as quickly as possible. The controller 30 also checks the temperature measured by the ambient temperature sensor 36 to determine temperatures outside the vehicle 10. Using the temperature outside the vehicle 10, the controller 30 also determines an initial moisture density threshold Ma that includes consideration of a pre-set comfort level humidity.

As indicated in FIG. 5, in the basic cooling mode the compressor 22 is operated such that the evaporator 28 is maintained using standard temperature cycling limits, such as a first temperature range $R_1$ having a lower temperature limit $T_1$ and an upper temperature limit $T_2$. The lower temperature limit $T_1$ is preferably just above the freezing point of water. The upper temperature limit $T_2$ is typically 3-5 degrees above the lower temperature limit $T_1$ but is variable depending upon the size of the vehicle 10, the capacity of the air conditioning system 12 and the size of the passenger compartment 14.

It should be understood that the lower temperature limit $T_1$ and the upper temperature limit $T_2$ can be attained by monitoring the temperature proximate the evaporator 28 via signals from the temperature sensor 35. Alternatively, the cycling of the compressor 22 can be achieved in a similar manner by monitoring the refrigerant pressure within the evaporator 28. Regardless, while operating in the basic cooling mode the temperature within the passenger compartment 14 is reduced to achieve the requested outlet temperature RO.

At step S2, the various parameters of the air conditioning system 12 are checked by the controller 30. Specifically, the temperature sensor 35, the ambient temperature sensor 36 and the passenger compartment temperature sensor 40 provide signals to the controller 30 indicating the temperature of air downstream from the evaporator 28, the ambient temperature outside the vehicle 10 and the temperature within the passenger compartment 14.

If any of the parameters detected by one or more of the sensors has changed, the controller 30 re-evaluates and possibly re-sets the moisture density threshold Ma at step S3. Specifically, the controller 30 monitors all sensors, and in particular, the ambient temperature sensor 36 to determine the outside temperature. The controller 30 may re-set the moisture density threshold Ma based upon the anticipated outside temperature at which condensation may occur on the windows 16.

At step S2, if there are no parameter changes, operation moves to step S4. At step S4, the controller 30 checks to see if the requested outlet temperature RO is less than the compressor "on" temperature (the temperature $T_2$ in the basic cooling mode, the temperature $T_4$ in the reduced load mode,). If the requested outlet temperature RO is not greater than the compressor "on" temperature RO, the standard cycling range $R_1$ is set, as indicated at step S5. Thereafter, operations go to step S10 where the compressor 22 is cycled according to the set cycling limits. If the requested outlet temperature RO is greater than the compressor "on" temperature RO, operation moves to step S6.

At step S6, the controller 30 pauses operation of the compressor 22 and enters the transition mode (unless operation is already in the reduced load mode). The evaporator 28 is allowed to increase in temperature until moisture begins to evaporate from the evaporator 28. At step S6, the controller 30 monitors the output of the humidity sensor 35 and the temperature sensor 34. If the moisture density threshold Ma is greater than the evaporator moisture (humidity) at the evaporator 28 then the cycling temperatures are increased from the range $R_1$ to, for example, the range $R_2$ as indicated at step S7 and in FIG. 5. After step S7, operation moves to step S9, as described further below.

At step S6, if the moisture density threshold Ma is not greater than the evaporator humidity at the evaporator 28, then operations move to step S8. At step S8, the cycling temperatures are decreased. At step S9, the cycling ranges are limited to being below the requested outlet temperature RO and above or equal to the standard cycling range $R_1$. It is within the steps S6, S7, S8 and S9 that the controller 30 begins to operate in the reduced load mode. Specifically, the humidity at the evaporator 28 is monitored and plays a large part in determining cycling operation of the compressor 30, as described below.

In the reduced load mode, the controller 30 cycles through steps S2, S3, S4, S6, S7, S8, S9 and S10, as depicted in FIG. 4. The compressor 22 is cycled on and off in order to maintain the humidity level downstream from the evaporator 28 at or below the moisture density threshold Ma. As a result, the temperature of the evaporator 28 typically falls within the second temperature range $R_2$ having a lower temperature limit $T_3$ and an upper temperature limit $T_4$, as indicated in FIG. 5. The lower temperature limit $T_3$ represents an example of a lower evaporator control limit and the upper temperature limit $T_4$ represents an example of a upper evaporator control limit.

The inventors have found that the temperature range $R_2$ has higher temperatures than the temperature range $R_1$. Specifically, the lower temperature limit $T_3$ is higher than the lower temperature limit $T_1$ and the upper temperature limit $T_4$ is higher than the upper temperature limit $T_2$, as indicated in FIG. 5. The lower temperature limit $T_3$ can be lower or higher than the upper temperature limit $T_2$ depending upon operating parameters and the ambient weather conditions.

Since the evaporator 28 operates within the higher temperature range $R_2$ in the reduced load mode, the compressor 22 does not operate as often or need to work as hard as in the basic cooling mode.

The basic cooling mode of the present invention is similar to conventional operating modes for conventional air conditioning systems, as indicated in the lower right hand portion of FIG. 5. However, the reduced load mode of the present invention using the moisture density threshold Ma to control compressor operation provides noticeable advantages over the conventional operating mode. For example, in the basic cooling mode and in conventional operating modes, the inventors observed that the compressor 22 operates for time periods $P_1$ and remains off for time periods $P_2$. This cycling of the compressor 22 on and off for time periods $P_1$ and $P_2$ indicates overall power consumption. However, in the reduced load mode, the controller 30 operates the compressor 22 for time periods $P_3$ and turns the compressor 22 off for time periods $P_4$. As shown in FIG. 5, the time period $P_1$ is longer than the time period $P_3$ and the time period $P_2$ is shorter than the time period $P_4$. Consequently, in the basic cooling mode and in conventional operating modes, the compressor 22 is on more frequently and for longer cycling intervals than in the reduced load mode of the present invention.

Second Embodiment

Figure 6:
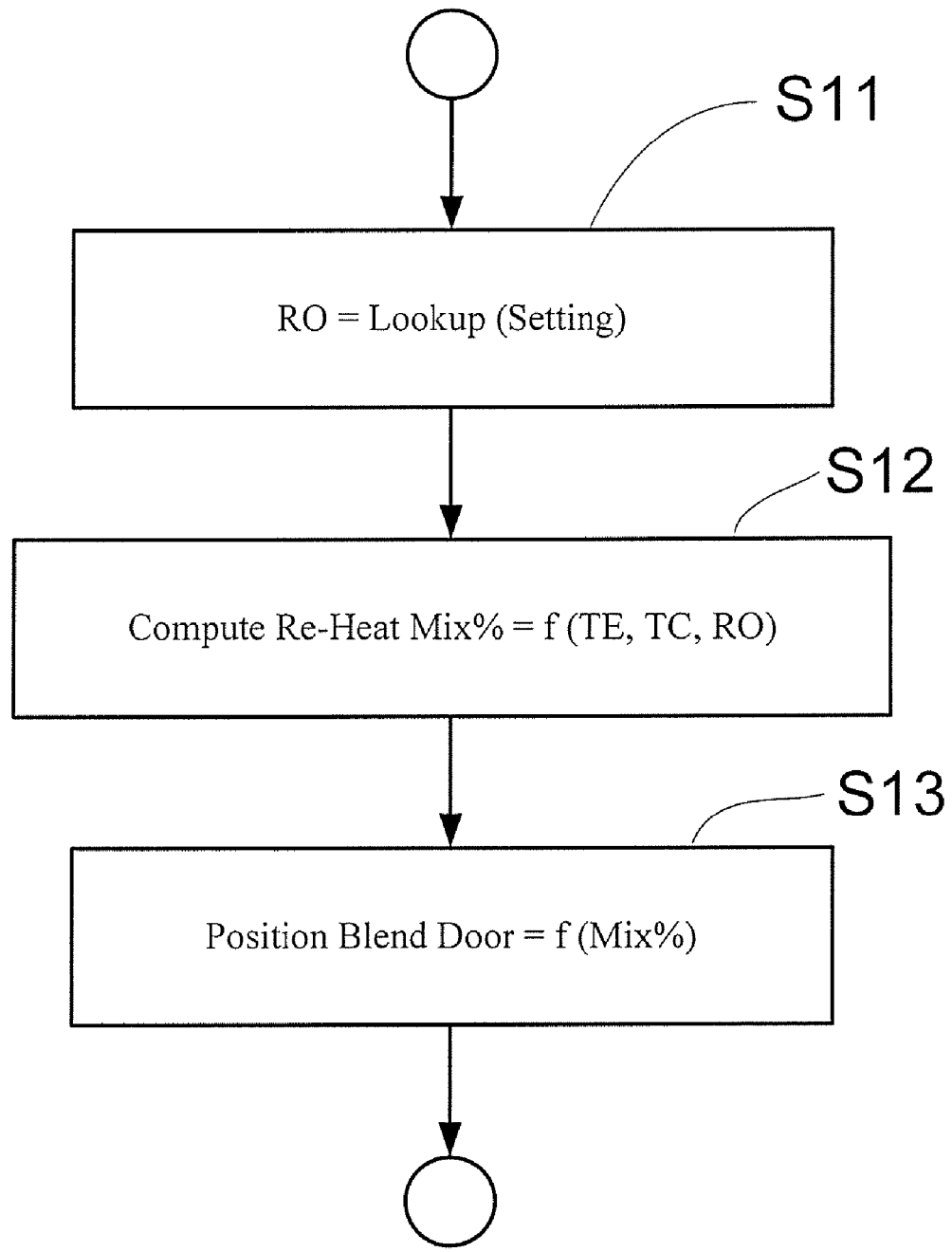
FIG. 6 is first flowchart showing an example of operational steps effected by the controller for controlling the heater core mixing portion in accordance with a second embodiment of the present invention.
Figure 7:
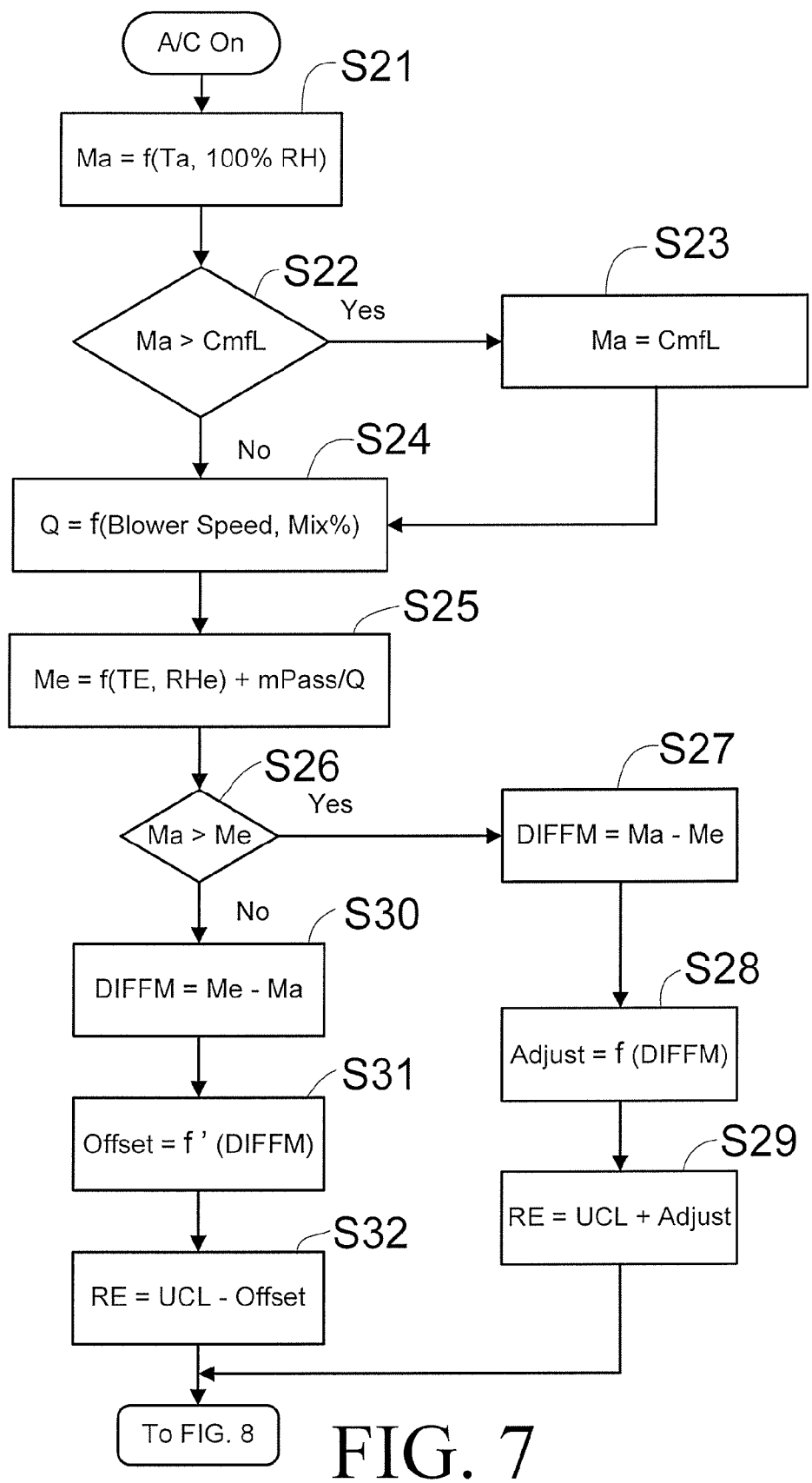
FIG. 7 is a second flowchart showing an example of operational steps effected by the controller for determining a moisture density threshold in accordance with the second embodiment of the present invention.
Figure 8:
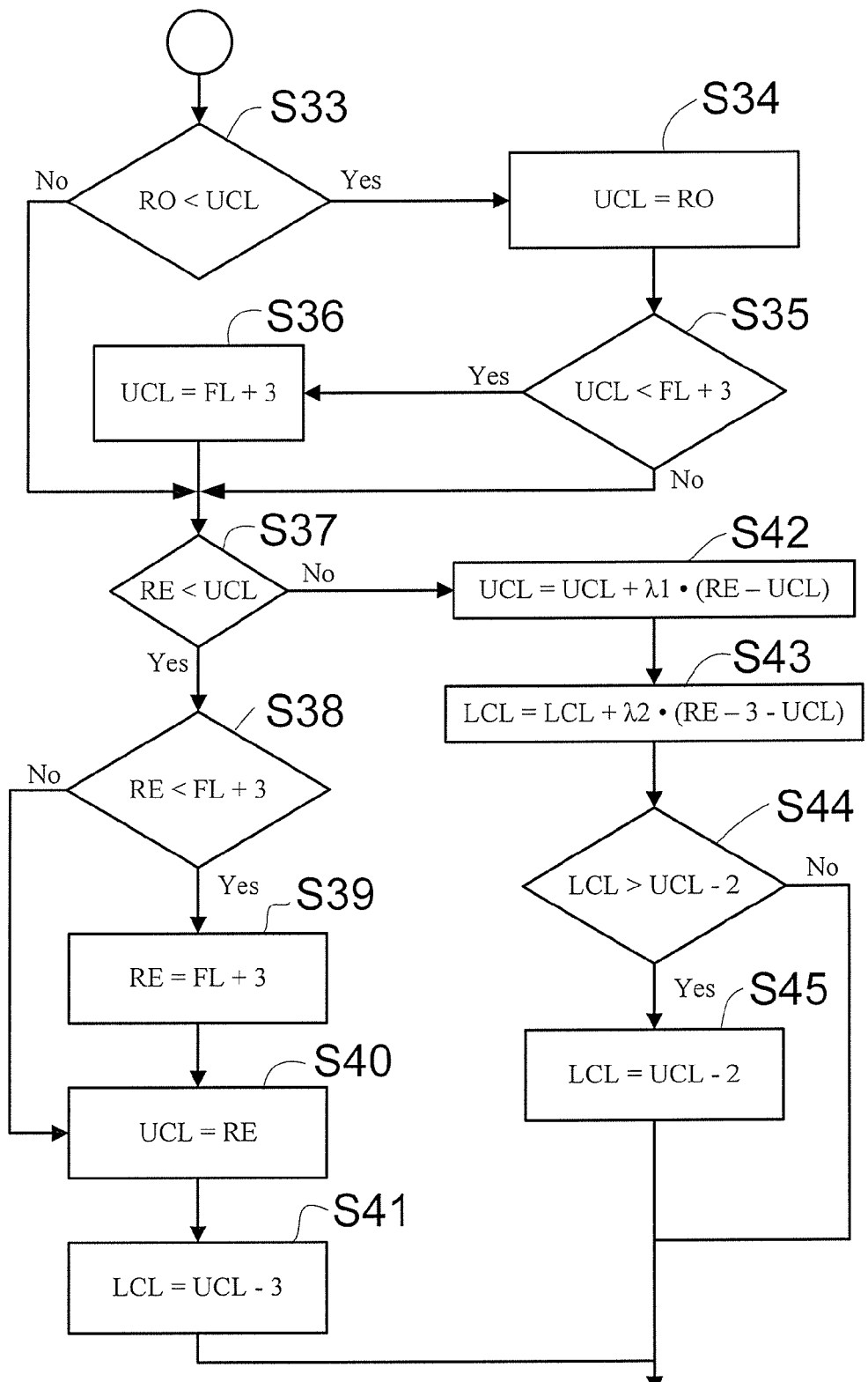
FIG. 8 is third flowchart showing an example of operational steps effected by the controller for operating the compressor in accordance with the second embodiment of the present invention.

Referring now to FIGS. 6, 7 and 8, operational steps in accordance with a second embodiment of the present invention will now be explained. In the second embodiment, the controller 30 is programmed or includes circuitry that enables operation of the compressor 22 including the basic steps described below. The second embodiment is another example of operation of the air conditioning system 12 by the controller 30 in accordance with the present invention.

In the second embodiment, the controller 30 operates the compressor 22 in a basic cooling mode, a transition mode and a reduced load mode, as described in greater detail below. In the second embodiment, the controller 30 is also programmed to control the positioning of the air flow control door 38.

As described above with respect to the first embodiment, in the basic cooling mode, the controller 30 typically cycles the compressor 22 on and off in order to remove heat as smoothly and rapidly as possible from air entering the passenger compartment 14. Since the basic cooling mode is basically conventional, description of the basic cooling mode is minimal for the sake of brevity.

FIG. 6 shows basic steps of the controller 30 for establishing and then maintaining the requested outlet temperature RO within the passenger compartment 14. The operational steps depicted in FIG. 6 are conducted during all three operational modes, the basic cooling mode, the transition mode and the reduced load mode.

At step S11 in the flowchart depicted in FIG. 6, the controller 30 checks the requested outlet temperature R0 made by the driver or passenger requesting that a specific temperature be established and delivered to the passenger compartment 14. At step S12, the controller 30 then calculates or determines the position of the air flow control door 38. The controller 30 determines the position of the air flow control door 38 by evaluating several factors, such as: the temperature TE downstream from the evaporator 28 as measured by the temperature sensor 35 (but upstream from the heater core 52); the coolant temperature TC of the engine 18 and the heater core 52; and the requested outlet temperature R0.

At step S13, the controller 30 sends signals to the air flow control door 38 corresponding to the computed position. The percentage of cooled air re-heated by diverting it through the heater core 52 varies depending upon weather conditions and vehicle conditions and is continuously recalculated by the controller 30.

Turning now to FIG. 7, a description of further processes of the controller 30 are described. Specifically, FIG. 7 shows, among other things, the basic steps for determining the moisture density threshold Ma along with initial settings for the lower evaporator control limit LCL and the upper evaporator control limit UCL for use in both the transition mode and the reduced load mode.

At step S21 the controller 30 determines an initial level for a moisture density threshold Ma. The setting of the moisture density threshold Ma is initially determined based on or as a function of the ambient air temperature Ta measured by the ambient temperature sensor 36 and an assumed 100 percent relative humidity RH at the ambient air temperature Ta. More specifically, the moisture density threshold Ma is initially set to be at a level where condensation is most likely to begin occurring on the windows 16 of the passenger compartment 14. It should be understood from basic meteorology that the relative humidity RH changes with changes in temperature. Therefore, the ambient air temperature Ta is continuously measured by the ambient temperature sensor 36.

At step S22 in FIG. 7, the controller 30 compares the moisture density threshold Ma with a comfort level humidity CmfL. The comfort level humidity CmfL is a predetermined level of humidity identified as being comfortable for vehicle passengers. The table below lists examples of comfort level humidity for a small sample of temperatures:

TABLE 1

| Temperature | 10 g/m$^3$ | 12.5 g/m$^3$ | 15 g/m$^3$ |
|---|---|---|---|
| 20° C. | 58% RH | 72% RH | 87% RH |
| 25° C. | 43% RH | 52% RH | 63% RH |
| 30° C. | 33% RH | 41% RH | 50% RH |

For the development of the present invention, the comfort level humidity was chosen to be approximately 12.5 g/m$^3$ of moisture in the air within the vehicle. However, the present invention is not limited to a comfort level humidity of 12.5 g/m$^2$ of moisture. It should be understood that 12.5 g/m$^3$ of moisture is an experimental value that is easily changed to suit the comfort level of the passengers of the vehicle 10. For example, in a luxury vehicle a humidity adjustment mechanism can be provided such that the comfort level humidity CmfL can be adjustable by a vehicle passenger. However, in most anticipated applications of the present invention, the comfort level humidity CmfL is a preset value stored in memory within the controller 30.

At step S22, if the controller 30 determines that the moisture density threshold Ma is larger than the comfort level humidity CmfL, then the moisture density threshold Ma is re-set to be the comfort level humidity CmfL at step S23 in order to ensure passenger comfort. Thereafter, operations move to step S24. At step S22, if the controller 30 determines that the moisture density threshold Ma is not larger than the comfort level humidity, then the moisture density threshold Ma remains unchanged and operations move to step S24.

At step S24, the cabin air flow Q is determined. Specifically, the controller 30 monitors the speed of the blower 32 and the position of the air flow control door 38 and determines the actual cabin air flow Q from the duct 48 into the passenger compartment 14. Specifically, the cabin air flow Q is a function of blower speed and the mixture of cooled air and re-heated air heated by the heater core 52 and the size of the ducts 48 and 50.

At step S25, the moisture density Me at the evaporator 28 is determined as a function of the air temperature at the evaporator 28 measured by the temperature sensor 35 and relative humidity RHe at the evaporator 28 measured by the humidity sensor 34, plus passenger moisture emissions mPass divided by the cabin air flow Q. In other words, the moisture density Me at the evaporator 28 is determined based upon several factors. The first factor is the air temperature at the evaporator 28 measured by the temperature sensor 35. The second factor is the relative humidity RHe at the evaporator 28 measured by the humidity sensor 34. The third factor is passenger moisture emissions mPass and the rate of the cabin air flow Q. The controller 30 determines the passenger moisture emissions mPass based upon stored data. Through breathing and mild perspiration, the average person emits an anticipated amount of moisture. Such information is stored in the memory of the controller 30 for use in step S25.

At step S26, the controller 30 compares the moisture density threshold Ma with the determined moisture density Me. If the moisture density threshold Ma is greater than the determined moisture density Me then operation moves to step S27. At step S27, a difference DIFFM between the moisture density threshold Ma and the moisture density Me is determined. At step S28, an adjustment is determined as a function of the difference DIFFM. At step S29, the required evaporator temperature RE is reevaluated and set based upon the upper evaporator control limit UCL plus the adjustment determined at step S28. Operations then move to FIG. 8, as described below.

At step S26, if the moisture density threshold Ma is not greater than the determined moisture density Me then operation moves to step S30. At step S30, a difference DIFFM between the moisture density Me and the moisture density threshold Ma is determined. At step S31, an offset is determined as a function of the difference DIFFM. At step S32, the required evaporator temperature RE is reevaluated and set based upon the upper evaporator control limit UCL minus the offset determined at step S31. Operations then move to FIG. 8, as described below.

In steps S27, S28 and S29, the difference DIFFM is converted into an adjustment by predetermined values that differ from vehicle to vehicle. Basically, the moisture densities (the moisture density threshold Ma and the moisture density Me) are affected by temperature changes. For a typical four passenger compact vehicle, the correlation between the difference DIFFM and the adjustment is different than that for a full sized van. Consequently, tables correlating the difference DIFFM with the adjustment are determined vehicle type by vehicle type and are stored in memory of the controller 30. Similarly, the difference DIFFM and offset determined at steps S30, S31 and S32 are determined vehicle type by vehicle type and are stored in memory of the controller 30.

Description of the operations of the controller 30 continues now with specific reference to FIG. 8. The steps in FIG. 8 represent operational steps of the transition mode and the reduced load mode, as described below.

At step S33 in FIG. 8, the requested outlet temperature RO is compared to the upper evaporator control limit UCL. Specifically, if the requested outlet temperature RO is less than the upper evaporator control limit UCL, then operation moves to step S34. At step S34, the upper evaporator control limit UCL is redefined as being equal to the requested outlet temperature RO. At step S35, the upper evaporator control limit UCL is compared to the freeze limit FL plus three degrees. It should be understood from the description herein that the addition of three degrees in S35 is merely one example of the practice of the present invention. For some applications of the present invention, an amount smaller than three degrees may be added and in other applications an amount greater than three degrees may be added. If the upper evaporator control limit UCL is less than the freeze limit FL plus three degrees, then control moves to step S36. If the upper evaporator control limit UCL is not less than the freeze limit FL plus three degrees, then control moves to step S37.

At step S33, if the requested outlet temperature RO is not less than the upper evaporator control limit UCL, then operation moves to step S37.

At step S37, the required evaporator temperature RE is compared with the upper evaporator control limit UCL. Specifically, if the required evaporator temperature RE is less than the upper evaporator control limit UCL, then operation moves to step S38.

At step S38, the required evaporator temperature RE is compared with the freeze limit FL plus three degrees. If the required evaporator temperature RE is not less than the freeze limit FL plus three degrees, operation moves to Step S40. If the required evaporator temperature RE is less than the freeze limit FL plus three degrees, operation moves to Step S39. At step S39, the required evaporator temperature RE is redefined as the freeze limit FL plus three degrees. At Step S40, the upper evaporator control limit UCL is redefined as the required evaporator temperature RE. At step S41, the lower evaporator control limit LCL is redefined as being equal to the upper evaporator control limit UCL minus three degrees.

At step S37, if the required evaporator temperature RE is not less than the upper evaporator control limit UCL, then operation moves to step S42.

Steps S42 through step S45 represent a portion of the transition mode. In other words, beginning at step S42, the evaporator 28 slowly warms up with each iteration of the logic set forth in the flowcharts. This process brings the evaporator 28 through the transition mode and up to temperatures enabling the reduced load mode.

At step S42, the upper evaporator control limit UCL is redefined as the upper evaporator control limit UCL plus the following: a predefined constant $\lambda 1$ multiplied by the difference between the required evaporator temperature RE and the upper evaporator control limit UCL. At step S43, the lower evaporator control limit LCL is redefined as being equal to the lower evaporator control limit LCL plus the following: a predefined constant $\lambda 2$ multiplied by the required evaporator temperature RE minus three degrees, minus the upper evaporator control limit UCL. Preferably the predefined constant $\lambda 2$ is slightly larger than the predefined constant $\lambda 1$. Both the predefined constant $\lambda 1$ and predefined constant $\lambda 2$ correspond to incremental increases in temperature that are determined based on the vehicle 10 and the capacity of the air conditioning system 12. Specifically, the predefined constant $\lambda 1$ and predefined constant $\lambda 2$ are experimentally derived to enable a smooth but gradual increase in the upper evaporator control limit UCL and the lower evaporator control limit LCL in the transition mode. As with step S39, in step S43, the minus three is not a fixed number, but merely one example of a desired difference between upper and lower temperature limits. For some systems, the difference between upper and lower control limits must be greater and for some systems smaller.

At step S44, the lower evaporator control limit LCL is compared to the upper evaporator control limit UCL minus two degrees. If the lower evaporator limit LCL is greater than the upper evaporator control limit UCL minus two degrees, then operation moves to step S45. At step S45, the lower evaporator limit LCL is redefined as being equal to the upper evaporator control limit UCL minus two degrees. At step S44, if the lower evaporator limit LCL is not greater than the upper evaporator control limit UCL minus two degrees, then operation returns to the top of FIG. 7 where the process cycles through continuously. In step S44 and S45, the minus two degrees is not a fixed number, but merely one example of a desired difference between upper and lower temperature limits. For some systems, the difference between upper and lower control limits may need to be greater and for some systems smaller.

Figure 9:
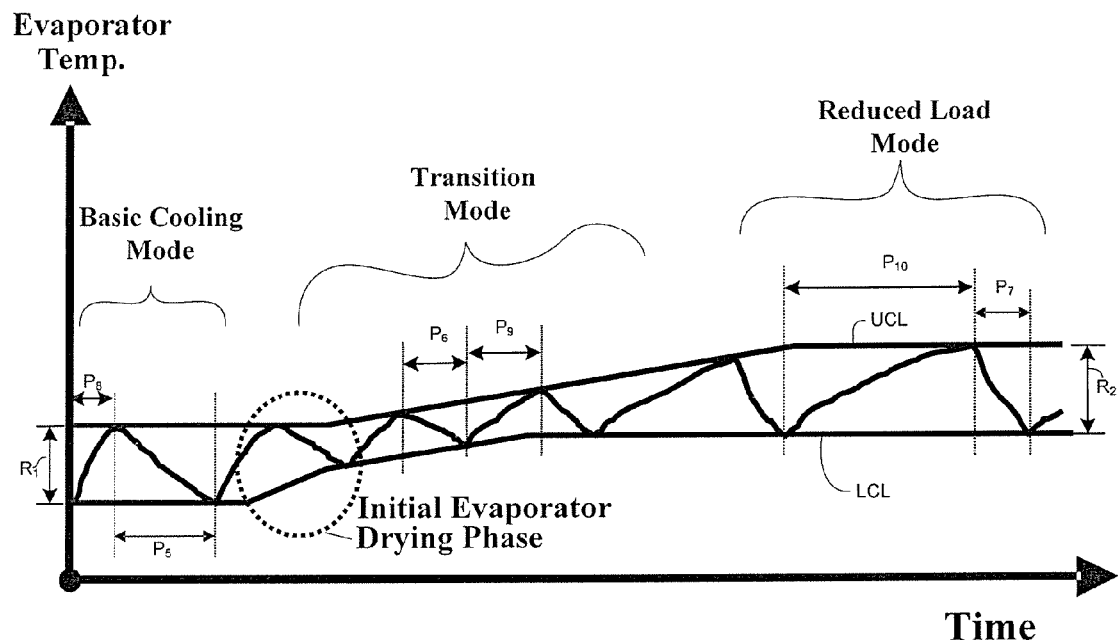
FIG. 9 is a chart showing evaporator temperature and compressor operation over time in a basic cooling mode, a transition mode and a reduced load mode in accordance with the second embodiment of the present invention.

As indicated in the central portion of the graph in FIG. 9, the upper evaporator control limit UCL and the lower evaporator control limit LCL are gradually increased so that the compressor 22 cycles on and off at a lower frequency. Specifically, toward the left side of the graph in FIG. 9 in the basic cooling mode, the compressor 22 cycles on for a period $P_5$. During the transition mode, the compressor 22 cycles on for a shortened period $P_6$. Once the controller 30 operates in the reduced load mode, the compressor 22 cycles on for an even shorter period $P_7$. As can be seen in FIG. 9, the period $P_5$ is greater than the time periods $P_6$ and $P_7$. Further the time period $P_6$ is greater than the time period $P_7$.

Also indicated in FIG. 9, the time periods where the compressor 22 is not operating consequently lengthen during the reduced load mode as compared to the basic cooling mode. The data represented in FIG. 9 confirms that the compressor 22 does less work in the reduced load mode than in the basic cooling mode. Specifically, in the basic cooling mode, the compressor is off for time periods $P_8$. In the transition mode the compressor cycles off for increased time periods, such as the time period $P_9$. In the reduced load mode the compressor cycles off for time periods $P_{10}$. As can be seen in FIG. 9, the period $P_{10}$ is greater than the time periods $P_9$ and $P_8$, thus confirming that the compressor 22 is cycled off for longer periods of time between the shortened time periods where it is cycled on in the reduced load mode.

Figure 10:
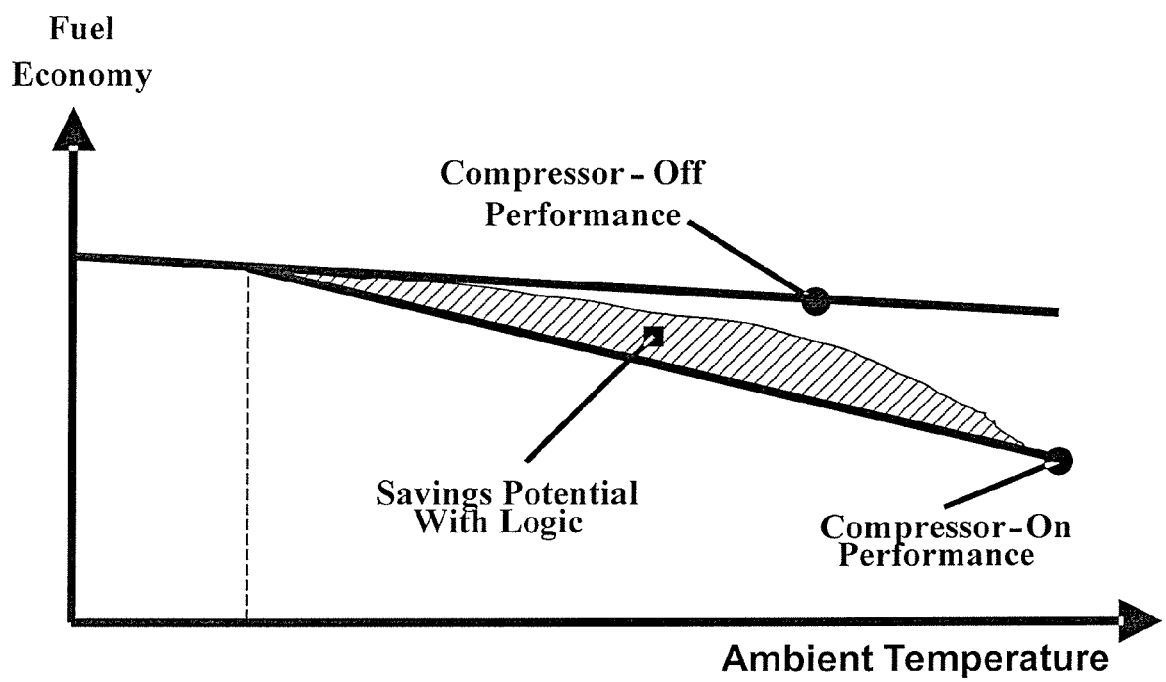
FIG. 10 is a chart representing data relating to fuel economy performance of the air conditioning system at various ambient temperatures in accordance with the present invention.

FIG. 10 is a chart showing ambient temperature on the X-axis and fuel economy on the Y-axis. Through various implementations of the present invention, the inventors have determined that the shaded area represents fuel economy savings potential with use of the present invention.

Figure 11:
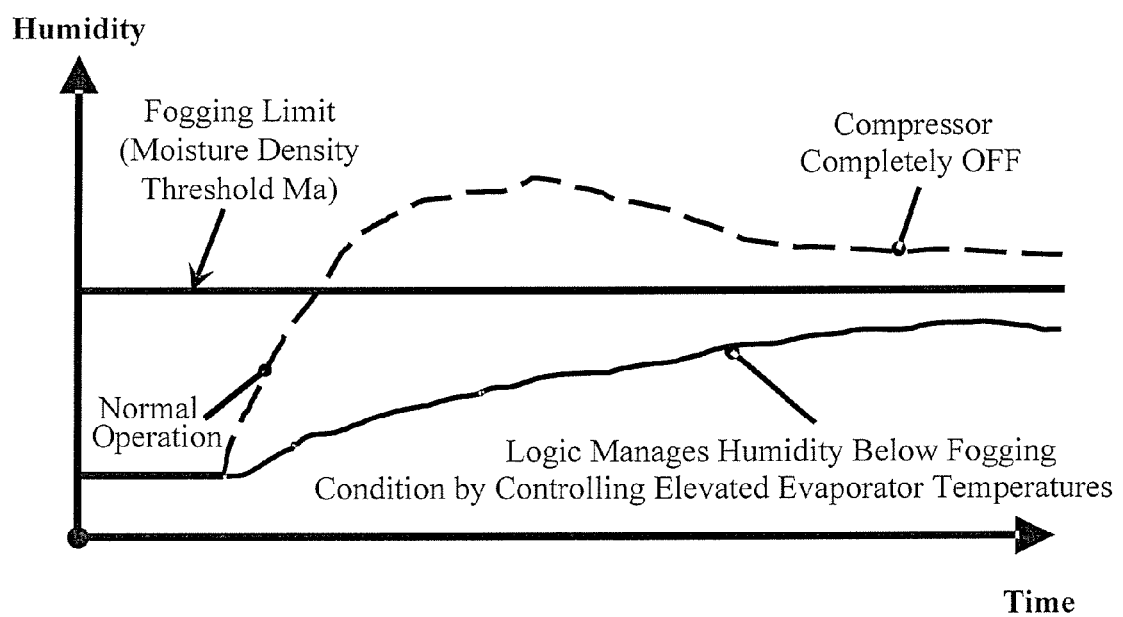
FIG. 11 is a chart representing data showing the relationship between compressor operation of the air conditioning system and humidity over time in accordance with the present invention.

FIG. 11 is a chart showing time on the X-axis and humidity on the Y-axis. Normal operation of a conventional air conditioning system is indicated in the dashed line. The condensation limit or fogging limit is indicated in the horizontal line. The humidity conditions managed by use of the controller 30 using the logic set forth above in the second embodiment of the present invention yielded humidity levels that approached but never crossed over the fogging limit while achieving the fuel economy depicted in FIG. 10.

Figure 12:
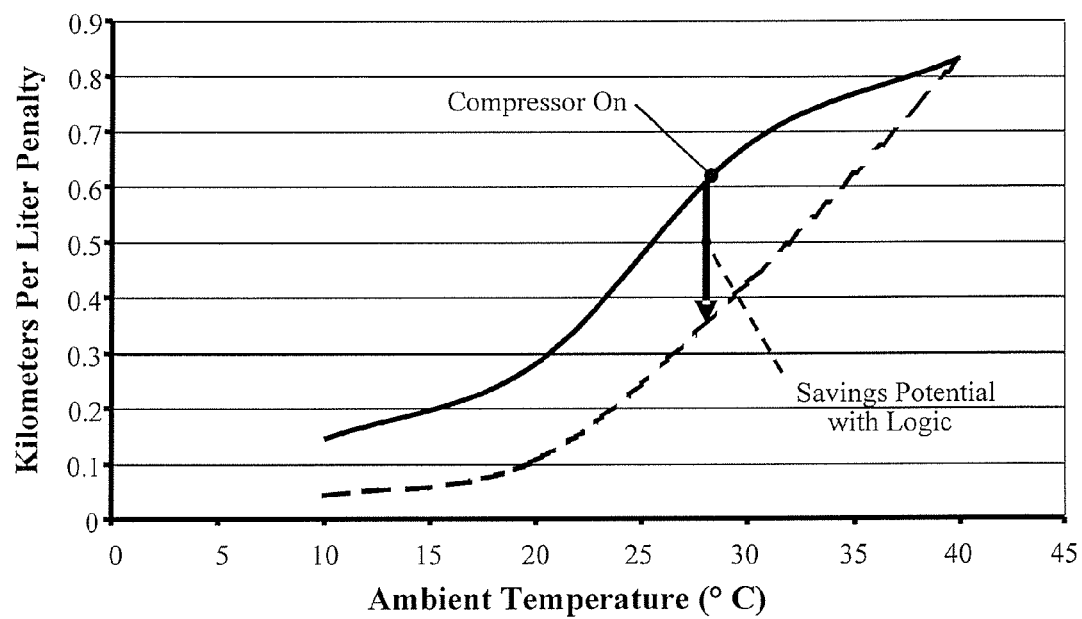
FIG. 12 is a chart representing potential energy savings using the air conditioning system in accordance with the present invention.

FIG. 12 is a chart showing ambient temperature on the X-axis and kilometers per liter fuel loss while driving with an air conditioning system on. For various ambient temperature operating conditions, the solid line shows the energy loss using a conventional air conditioner. Specifically, the solid line represents energy take from the engine used to cycle on and off a compressor of a conventional air conditioning system. The dashed line represents the energy from the engine 18 used to cycle on and off the compressor 22 of the air conditioning system 12 of the present invention. The graph shows a significant reduction in the energy usage when driving using the air conditioning system 12 in accordance with the present invention.

As demonstrated in the above embodiments, in the transition mode and the reduced load mode of operation, the controller 30 controls operation of the compressor 22 in order to maintain the humidity level at the evaporator 28 (and hence within the passenger compartment 14) below a predetermined level using the determined moisture density threshold Ma. Consequently, unwanted odors from the evaporator 28 are reduced or eliminated; condensation or fogging on the windows 16 is reduced and/or eliminated; the passenger compartment 14 is maintained at a comfortable temperature; and there is a reduction in workload done by the compressor 22 resulting in fuel economy savings.

Further, since the controller 30 maintains the evaporator 28 at elevated temperatures compared to conventional modes of operation, the amount of cooled air from the evaporator 28 that is re-heated by passing a portion of the cooled air through the heater core 52 is reduced. In other words, the Mix % depicted in FIG. 6 is minimized with the controller 30 operating in either the transition mode or the reduced load mode. Hence, less cooled air is re-heated.

The controller 30 preferably includes a microcomputer with an air conditioning control program that controls the air conditioning system 12 as discussed below. The controller 30 can also include other conventional components such as an input interface circuit, an output interface circuit, and storage devices such as a ROM (Read Only Memory) device and a RAM (Random Access Memory) device. The microcomputer of the controller 30 is programmed to control the air conditioning system 12. The memory circuit stores processing results and control programs such as ones for compressor operation that are run by the processor circuit. The internal RAM of the controller 30 stores statuses of operational flags and various control data. The internal ROM of the controller 30 stores data, threshold values and instructions for various operations.

It will be apparent to those skilled in the art from this disclosure that the precise structure and algorithms for the controller 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The various components of the vehicle 10 are conventional components that are well known in the art. Since vehicles are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air conditioning system comprising:
   a compressor configured to compress refrigerant;
   a condenser fluidly coupled to the compressor to receive the refrigerant from the compressor;
   an evaporator fluidly coupled to the condenser to receive the refrigerant from the condenser and fluidly coupled to the compressor to supply the refrigerant to the compressor;
   a humidity sensor positioned proximate the evaporator to detect moisture density of air passing through the evaporator towards a vehicle passenger compartment; and
   a controller operatively coupled to the humidity sensor and the compressor to cycle the compressor on and off to maintain the moisture density of the air being cooled by the evaporator and sensed by the humidity sensor below a predetermined moisture density threshold.

2. The vehicle air conditioning system according to claim 1, wherein
   the controller is operatively coupled to an ambient temperature sensor that is configured to measure air temperature outside of the passenger compartment, the controller being configured to set the moisture density threshold based on the air temperature outside of the passenger compartment to reduce window condensation.

3. The vehicle air conditioning system according to claim 2, wherein
   the controller is further configured to set the moisture density threshold in response to predetermined passenger moisture emissions.

4. The vehicle air conditioning system according to claim 3, wherein
   the controller is configured to determine passenger moisture emissions based on data stored in memory within the controller.

5. The vehicle air conditioning system according to claim 3, wherein
   the controller is operably coupled to at least one passenger detection device that detects presence of at least one passenger, and the controller is configured to determine passenger moisture emissions based on the presence of the at least one passenger.

6. The vehicle air conditioning system according to claim 1, further comprising:
   a heater core; and
   an air mixing assembly configured to selectively divert at least a portion of the air passing through the evaporator to the heater core, with the controller being operatively coupled to the air mixing assembly to control an amount of the air passing through the evaporator that is diverted to the heater core to attain a predetermined temperature range.

7. A method for operating a vehicle air conditioning system comprising:
   cooling air entering a passenger compartment by blowing the air through an evaporator of a refrigerant circuit;
   monitoring moisture density of the air flowing to the passenger compartment at the evaporator;
   setting a moisture density threshold for the air entering the passenger compartment; and
   cycling a compressor of the refrigerant circuit between a refrigerant compressing state and an non-compressing state to maintain the moisture density of the air entering the passenger compartment below the moisture density threshold.

8. The method according to claim 7, wherein
   the setting of the moisture density threshold includes measuring ambient temperature outside of the passenger compartment to determine a condensation temperature for preventing condensation on an inner surface of a vehicle window.

9. The method according to claim 8, wherein
the setting of the moisture density threshold includes using passenger moisture emissions as a basis for determining the condensation temperature for preventing condensation on the inner surface.

10. The method according to claim 9, further comprising
selectively heating a portion of air entering the passenger compartment to maintain air temperature within the vehicle compartment within a predetermined temperature range.

11. A method for operating a vehicle air conditioning system comprising:
blowing air through an evaporator of a refrigerant circuit bringing an air temperature within a passenger compartment to a requested outlet temperature;
setting a moisture density threshold for the air entering a passenger compartment;
monitoring moisture density of the air flowing through the evaporator prior to the air entering the passenger compartment; and
cycling a compressor of the refrigerant circuit on and off to maintain the moisture density of the air entering the passenger compartment below the moisture density threshold and to maintain the air temperature within the passenger compartment at approximately the requested outlet temperature.

12. The method according to claim 11, wherein
the setting of the moisture density threshold includes measuring ambient temperature outside of the passenger compartment to determine a condensation temperature threshold at which condensation is likely to occur on an inner surface of a vehicle window.

13. The method according to claim 12, wherein
the setting of the moisture density threshold includes using predicted passenger moisture emissions as a basis for determining the condensation temperature.

* * * * *